United States Patent

[11] 3,612,455

[72] Inventors Charles G. Cole;
Judy I. Cole, both of P. O. Box 147,
Sheldon, Mo. 64784
[21] Appl. No. 881,262
[22] Filed Dec. 1, 1969
[45] Patented Oct. 12, 1971

[54] FISHING POLE HOLDER
2 Claims, 2 Drawing Figs.
[52] U.S. Cl. .................................................. 248/44
[51] Int. Cl. .................................................. A01k 97/10,
A45f 3/44
[50] Field of Search ........................................... 248/44, 38,
46, 42, 156, 83, 85, 87, 175

[56] References Cited
FOREIGN PATENTS
480,353  1/1952  Canada ..................... 248/85

Primary Examiner—William H. Schultz
Attorney—Schmidt, Johnson, Hovey & Williams

ABSTRACT: A holder for supporting a fishing pole, the holder comprising a pair of wire members which are bent into particular shapes and attached together to form a unitary assembly, each wire having one end extended downwardly to form a leg which can be inserted into the ground or sand while the opposite ends of the wires serve to support the fishing pole thereupon during fishing.

PATENTED OCT 12 1971
3,612,455
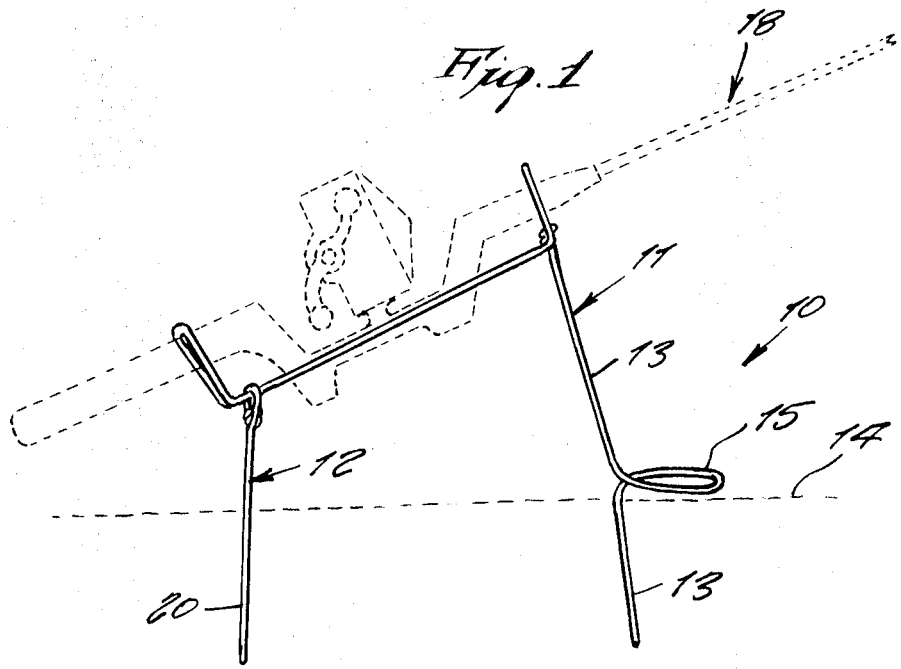
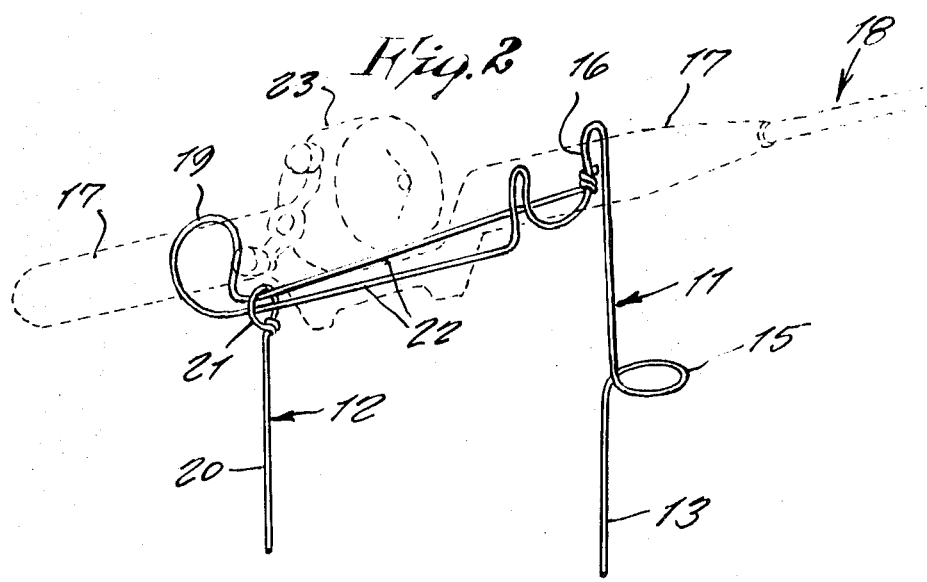
INVENTORS
CHARLES G. COLE
and
JUDY I. COLE

FISHING POLE HOLDER

This invention relates generally to fishing rod stands.

A principal object of the present invention is to provide a fishing pole holder which is designed for holding casting, spinning or small cane poles.

Another object of the present invention is to provide a fishing pole holder which can be quickly and easily erected upon a shore or the beach and through which a fishing pole can be supported during fishing action thereby eliminating the necessity of the fisherman holding the fishing pole in his hands.

Still another purpose of the present invention is to provide a fishing pole holder comprising of a pair of formed wires which when not in use can be readily and easily stored within a minimum space and which can be conveniently transported by a fisherman during a fishing expedition.

Still another purpose of the present invention is to provide a fishing pole holder having a self contained means for preventing the holder from sinking below a predetermined distance into the ground, thereby assuring that a fishing pole is inclined at a desired angle during fishing action.

Other objects of the present invention are to provide a fishing pole holder which is simple in design, inexpensive to manufacture, rugged in construction, easy to use and efficient in operation.

These and other objects will be readily evident upon a study of the following specification and the accompanying drawing wherein:

FIG. 1 is a side view of the present invention,

FIG. 2 is a perspective view thereof.

Referring now to the drawing in detail, the reference numeral 10 represents a fishing pole holder according to the present invention wherein there are a pair of separate wire members 11 and 12 made of stiff wire formed preferably of aluminum so as to resist rusting.

The wire member 11 is made preferably of a length of wire of 3 feet and 10 inches in length. One end of the wire is retained straight so as to form a leg 13 that can be inserted into the ground or sand 14 on a shore or beach. Intermediate the opposite ends of the leg 13 there is formed a loop 15 extending in a horizontal plane when the leg 13 is in a vertical plane so that the loop 15 rest upon the surface of the ground 14 and thus aids to prevent the leg from sinking downwardly into the ground beyond a prescribed distance. A U-shaped saddle 16 is then formed adjacent the upper end of leg 13 the saddle 16 serving to support the forward portion 17 of the fishing pole handle of fishing pole 18. Adjacent the saddle 16, the wire extends rearwardly in a generally downwardly inclined angle so as to form an upwardly extending arch 19 beneath which a rear end of the fishing pole handle 17 may be hooked. The terminal end of the wire then extends forwardly from the arch and is secured at its terminal end to one side of the saddle 16.

The wire member 12 has one end thereof extending in a straight vertical direction to form a leg 20 the upper end of the leg having a loop 21 formed by a terminal end of the wire, the loop 21 being grasped around the two straight wire portions 22 of wire member 11 extending between the saddle and the arch. The loop 21 grasps the wire portions 22 only loosely. The length of the wire member 12 is preferably only 1 foot and 10 inches. Preferably both wire members are made of number 9 aluminum wire. The device as assembled in FIG. 1 is now ready for operative use.

In operative use, the wire member 11 serves as a forward leg for the holder and also serves as a cradle upon which the fishing pole 18 can be placed. The leg 13 of the wire member 11 is inserted into the ground 14 while the rear leg 20 of wire member 12 is then inserted likewise into the ground, as shown in FIG. 1. The fishing pole 18 is then placed upon the holder by inserting the rear end of handle 17 under the arch 19, after which the forward portion of handle 17 is lowered into the saddle 16. A fishing reel 23 forming a part of the fishing pole can thus be positioned between the arch and the saddle so that the fishing reel can be conveniently operated. It is to be noted that due to the relative downward force at the forward end of the fishing pole, the fishing pole can be retained in the diagonal position indicated in FIG. 1 due to the arch 19 holding down the rear end of the handle. Thus a fisherman's hands are free to do other task or activities while the fishing pole is in an operative position for fishing action.

What we now claim is:

1. In a fishing pole holder, the combination of a pair of wire members, one of said wire members forming a fore leg of the holder and a cradle for the fishing pole, the other of said wire members serving as a rear leg of the holder, said one member having one end thereof in a straight configuration to form a vertical leg, an intermediate portion of said leg having a horizontal loop formed therein, the upper end of said leg having a U-shaped saddle, a first straight portion of said one member extending rearwardly from said saddle, an upwardly extending arch formed in said one member at the rear end of said first straight portion, a second straight portion of said one member extending forwardly from said arch, the terminal end thereof being secured to said saddle.

2. The combination as set forth in claim 5, the other of said wire members having a vertical leg formed at one end thereof, the other end of said other wire member having a loop formed therein, said loop being grasped around at least one of said straight portions of the one member which extend between said saddle and said arch.